June 12, 1928.                    1,673,344
W. V. WALLBURG
METHOD AND APPARATUS FOR MARKING THE TOPS OF CONFECTIONS
Filed March 19, 1926
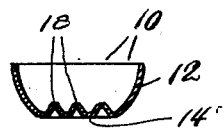
Fig. 1.
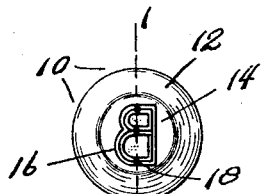
Fig. 2.
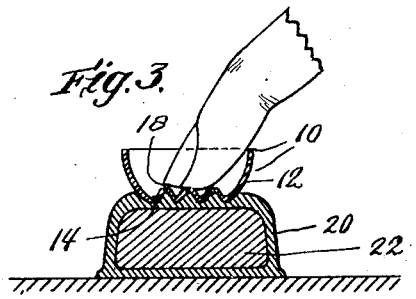
Fig. 3.
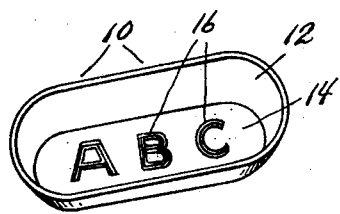
Fig. 6.
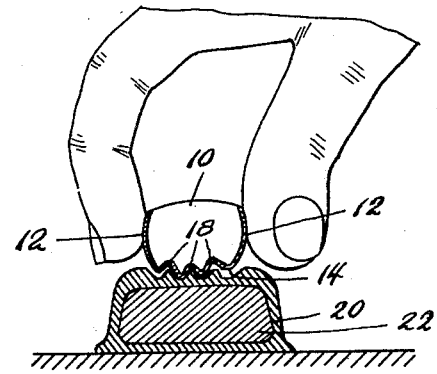
Fig. 4.
Fig. 5.
Inventor,
William V. Wallburg
by
atty Patented June 12, 1928.

1,673,344

UNITED STATES PATENT OFFICE.

WILLIAM V. WALLBURG, OF BOSTON, MASSACHUSETTS.

METHOD AND APPARATUS FOR MARKING THE TOPS OF CONFECTIONS.

Application filed March 19, 1926. Serial No. 96,086.

This invention relates to confections, and particularly, although not necessarily limited, to chocolate-coated confections, and methods and devices for making confections with identifying marks or ornamental designs contained on or in the top surfaces thereof.

It is customary practice to provide certain kinds of confections as, for instance, chocolate-coated confections, with an identifying or trade mark on the bottoms thereof while the tops of the confections are plain or, at least, are not provided with a design by which the manufacturer may be readily identified.

The confections are usually packed in boxes and are displayed for sale resting on their bottoms. The identifying trade mark is thus concealed, so that a prospective purchaser has no assurance that the confections are the particular brand he desires or that the confections are made by the manufacturer whose product he desires to purchase, unless he turns over a confection and inspects the bottom thereof, which, ordinarily he does not do, for various reasons.

It is an object of this invention to provide confections, and particularly coated confections, with identifying marks, or ornamental designs on or in their tops, in which location the designs or marks may be seen readily without disturbing the packing or arrangement of the confections.

A further object of the invention is a method of applying the identifying marks to soft confections and to freshly coated confections, while the coating is still soft, by placing on each confection, either by mechanical means or by hand, a die which has a suitable design formed in its lower face, and forcing the die, or permitting it to sink by its weight, into the soft coating, to be somewhat embedded therein, and allowing the die to remain on the confection until it or the coating sets or becomes hardened, whereby to retain therein the imprint of the die.

A yet further object of the invention is the provision of a type of die which is inexpensive, to permit duplicates to be manufactured in large quantities, and which has such characteristics as will enable it to be removed readily from the confection without damage to the confection or its coating.

A further object of the invention is the provision of a flexible die which can be deformed to cause it to be detached from its engagement with the top of the hardened confection, and which will return by its inherent resiliency to its normal shape when the deforming pressure upon it is removed.

Fig. 1 is a sectional elevation through a die adapted for use as a part of this invention and embodying certain novel features.

Fig. 2 is a plan view of the die.

Fig. 3 is a view illustrating the manner of applying the die to the soft confection.

Fig. 4 is a view similar to Fig. 3 but illustrating the manner of flexing the die to remove it from the hardened confection.

Fig. 5 is a plan view of the die-marked confection.

Fig. 6 is a modified form of die.

In the usual commercial process in making chocolate-coated confections, with which this invention is particularly concerned, the uncoated centers are placed on the moving conveyor belt of an enrobing machine, in which machine the centers receive a chocolate coating. The coated centers are then conveyed by a moving belt into a cool hardening room wherein the coatings set or become hardened. The confections are then removed from the conveyor belt and packed or otherwise stored.

In carrying out this invention, I place individual dies on the tops of the freshly coated centers while the coatings are soft and, in the case of machine-made goods, just after they emerge from the enrobing machine. The dies are pressed down into the coatings, or are allowed to sink therein by their own weight, whereby to become somewhat embedded in the coatings, and are allowed to remain on the confections as they pass into and while they are in the hardening room, and at least until the coatings become hard. The dies are then removed from the coated confections and may be returned to the enrobing machine for repeated use.

In Figs. 1 and 2, which are illustrative of a die embodying certain features of this invention, the die comprises a relatively resilient, temporarily deformable cup-shaped member 10 which is composed of some suitable material which can be moulded readily into the desired shape. Celluloid is a suitable material. The die preferably is somewhat larger at the top than at the bottom and has a side wall 12 which is inclined downwardly and inwardly from the top edge to the bottom wall 14. The bottom wall 14 is provided with a suitable identifying mark or design 16 which is formed, as moulded, in the bottom wall, either in intaglio or in relief, intaglio being here shown.

If necessary, suitable small apertures 18 may be formed in the bottom wall of the die in positions to communicate with the recesses therein and permit air to escape therefrom when the die is imbedded in the soft confection, thereby to prevent formation of air pockets which might otherwise interfere with the formation with a sharply defined mark on the confection.

The die is adapted to be placed on top of the soft coating 20 of the center 22 just after the confection leaves the enrobing machine or at least while the coating is still soft, and in the manner illustrated in Fig. 3.

The die may be pressed into the soft coating or it may sink therein by its weight, thereby to become somewhat embedded in the coating. The soft coating thus is caused to fill the recesses in the bottom of the die so that, when the die is subsequently removed from the hardened or set coating, the coating will be found to have conformed with the configuration of the bottom face of the die as illustrated at 16ᵃ in Fig. 5 and will subsequently retain this configuration.

It has been found that the chocolate coatings are liable to become broken if it is attempted to remove the die from the hardened coating by directly lifting it off, for the reason that the die is caused to adhere strongly to the coating by atmospheric pressure, since the hardened coating is directly against the bottom of the die and air is excluded from the contact junction. It has been further found, however, that this trouble is eliminated by manipulating the die in such a manner that it is separated from the coating first at the sides of the die so that air can enter the space between the coating and the die, thereby breaking the air seal. To this end, the die is made of thin and flexible material and has a side wall which is adapted to extend above the top of the coated confection by an amount sufficient to permit it to be grasped readily by the fingers as illustrated in Fig. 4. The opposite sides of the die are adapted to be pressed inwardly thereby to flex the die and to cause its sides to separate from the edge of the impression made in the coating, in the manner illustrated in this figure. Air is thereby permitted to enter the space thus formed and to break the seal so that the die can be lifted out of the impression without injury to the coating. The die is adapted to be sufficiently resilient to return to its original shape after the deforming pressure has been removed, and be in condition for indefinite repeated use.

The die need not be of circular shape. It can be of any suitable shape and in Fig. 6 is illustrated a flexible oblong cup-shaped die, especially adapted for similarly shaped confections. It is not important that the die be of cup shape. It may be of any suitable shape provided that it conforms with the requirements above set forth.

I claim:

1. The method of marking the tops of confections which consists in embedding a flexible die into the top of a soft confection, allowing the soft confection to harden with the die embedded therein, flexing inwardly opposite side walls of the die to detach it from the confection, and thereupon removing the die.

2. A die for marking the tops of confections having a flexible bottom face which bears an appropriate design and flexible upstanding side walls, said die characterized by being deformable under pressure on its side walls, whereby to break its attachment with the confection.

3. A die for marking the tops of confections having upstanding side walls and a bottom face which bears an appropriate design which is adapted to be imparted to the confection, said die characterized by being resilient and adapted to be deformed under pressure, whereby to break its attachment with the confection, and to assume its original shape when the pressure upon it is removed.

4. A die for marking the tops of confections comprising a cup-shaped member having an appropriate design in its bottom face, which design is adapted to be imparted to the confection, said cup-shaped member characterized by being resilient and temporarily deformable upon application of pressure on its side walls, whereby to break its attachment with the confection, and to assume its original shape when pressure on its side walls is removed.

5. A die for marking the tops of confections having a bottom face which bears an appropriate design and which is flexible and inherently resilient so as to return to its normal shape upon removal of deforming force, said die also having oppositely disposed portions extending upwardly from the bottom face, by which said face may be flexed.

In testimony whereof, I have signed my name to this specification.

WILLIAM V. WALLBURG.